Patented Aug. 21, 1951

2,565,354

UNITED STATES PATENT OFFICE 2,565,354

CHEMICAL PROCESS FOR REMOVAL OF ORGANIC PEROXIDES

Charles A. Cohen, Roselle Park, N. J., assignor to Standard Oil Development Company, a corporation of Delaware No Drawing. Application January 14, 1948, Serial No. 2,329

6 Claims. (Cl. 260—666.5)

This invention relates to a process for the removal of peroxides and dissolved oxygen from organic liquids.

In the production of synthetic rubber either by the polymerization of a single conjugated diene or as a co-polymer of a diene with various conjugated compounds or simple olefins, the more readily oxidizable constituents of plant streams at times pick up oxygen or develop peroxides on relatively short storage and initiate the formation in various pieces of process equipment of a variety of polymers which tend to cause plugging and necessitate shut-down for cleaning out and removal. These polymers vary and often are characterized by a "pop corn" appearance which is particularly obnoxious since the pop corn type of polymer is autocatalytic in character and is capable of growing by a process analogous to intussusception.

According to this invention the process consists in the treatment of the hydrocarbon, whether in liquid state or in a normally gaseous state, with a solution of sodium hydrosulfite ($Na_2S_2O_4$) to which has been added a material which is readily reducible with hydrosulfite but whose reduced state is readily oxidizable back to its stable atmospheric form by oxygen or organic peroxides. Among materials possessing these characteristics are dyestuffs belonging to the triphenylmethane series, vat dyes and those having a substituted thionine structure. As specific examples of the latter class are methylene blue and toluidine blue. While it is generally adaptable with certain modifications to the treatment of all organic liquids stable to water and mild concentrations of alkali, it is particularly adaptable in simplified form to the treatment of hydrocarbons, such as petroleum white oils, naphtha boiling between 300° F. and 500° F., turpentine, dipentene, cyclohexene and unsaturated hydrocarbons having from 4 to 8 carbon atoms to the molecule and including both diolefins, mono-olefins, polymers of mono-olefins, such as diisobutylene and particularly those that are used in the manufacture of synthetic rubber.

One of the objects of this invention is to treat these hydrocarbon streams with the reagents described above so as to remove all traces of peroxides and dissolved oxygen. In so doing, it has been found that equipment handling these hydrocarbon streams may be kept entirely free from any formation of polymer.

Sodium hydrosulfite has been in use in the dye and textile industry for many years and serves the purpose generally for the reduction of vat dyes to their leuco bases in which state they are more readily soluble and offer ease in application to cloth. The characteristic color of the dye is then developed on the cloth by exposure to air or to a mild oxidizing agent. While sodium hydrosulfite is a powerful reducing agent and would be normally expected to react with peroxides or atmospheric oxygen, the rate of reaction is quite slow and contact over a prolonged period of time is necessary if sodium hydrosulfite alone is used to attempt to remove peroxides from organic materials. The addition of a material such as methylene blue, which is instantly reduced to its leuco-base by means of the hydrosulfite, is capable of rapidly reacting with peroxides in organic liquids and also with atmospheric oxygen and can completely remove both of these offending materials from any system wherein the combination of sodium hydrosulfite and methylene blue is contained. While it should not be considered a limitation on the theory of this invention, it is believed that the mechanism whereby this combination works so rapidly involves the formation of the leuco-base of the dyestuff which is very rapidly reoxidized to its normal state by means of peroxide or oxygen whereupon the normal state of the dyestuff is rapidly reduced again to its leuco-base. This reduction-oxidation reaction proceeds quite rapidly until all traces of peroxide and oxygen are removed.

In the practice of this invention, it is preferred to use a solution of sodium hydrosulfite between the limits of 5 and 20 grams per 100 ml. to which has been added a dye such as methylene blue in the proportion of from .02 to 1 gram per 100 ml. With certain types of peroxide and where an alkaline reaction is undesirable, the alkalinity normally present in the hydrosulfite may be neutralized or the solution made slightly acid and the solution made less susceptible to atmospheric oxygen by the addition of sodium bisulfite or sodium or potassium meta bisulfite. The hydrocarbon stream, for example butadiene, may be contacted with this reagent in a conventional agitator and settler or the solutions may be contacted countercurrently in a packed or bubble-cap tower. The reducing characteristics of the solution is self-indicating in that when it loses the power to remove peroxide, it can no longer reduce the methylene blue to its colorless leuco state and the solution develops the characteristically strong color of the dye. Where it is desired to process hydrocarbons or gaseous hydrocarbon streams which are normally gaseous at ordinary temperatures, or where it is desired to process gas streams to remove oxygen contained in them, somewhat better contact with the solution is obtained when a dispersing and wetting agent of the sulfonate type, such as the petroleum mahogany sulfonates and an oil, is added. The function of the sulfonate is to form an oil soluble mahogany sulfonate leuco-base which provides better contact with the preferentially oil soluble hydrocarbon stream.

In a similar manner, hydrophylic organic liquids may be contacted with hydrocarbon solutions containing the mahogany sulfonate-methylene blue leuco-base which is separately reduced on oxidation, to its leuco-base by means of contacting it with a solution of sodium hydrosulfite.

This process is especially adapted to remove peroxides without any appreciable loss of the olefins, which term includes diolefins and substituted olefins from olefins such as isobutylene, butadiene, styrene, etc. before or after separation and concentration of the hydrocarbons.

As specific embodiments of this invention the following examples may be cited:

*Example I*

Isoprene which had developed a considerable concentration of peroxides as shown by liberation of free iodine from an acidified solution of potassium iodide, was fed continuously to an agitator along with 10% by volume of an aqueous solution containing per 100 ml., 5 grams of sodium hydrosulfite ($Na_2S_2O_4$), 5 grams of sodium bisulfite ($NaHSO_3$) and 0.0005 gram of toluidine blue. Temperature was maintained at about 20° C. and the rate of flow of both the isoprene and the reagent was such as to give a residence time in the agitator of about 15 minutes. The agitator contents were permitted to overflow into a continuous settler from which the isoprene as an upper layer overflowed into a chamber from which it was pumped continuously to a wash column where it was water washed, permitted to settle, and then dried by percolation through a small quantity of clay. The effluent after leaving the wash column was perfectly free of all traces of peroxides. The reagent from the first settler was recycled back to the initial agitator where it was used to treat further quantities of feed isoprene. When the reagent began to acquire a bluish color, it indicated that the reducing power for peroxides had been lost and was discarded.

While acidified potassium iodide may be used for the detection and determination of gross amounts of peroxides, it fails with some certain types of peroxides, especially those which are in solution in highly hydrophobic compounds, and at best requires considerable time for completion of the reaction. A method which is somewhat more sensitive but has some shortcomings depends on the oxidation of a 10% solution of ferrous sulphate in 50% aqueous acetone to the ferric salt whereby a red color is developed due to the formation of ferric thiocyanate. Ammonium or potassium thiocyanate is present in the reagent along with the ferrous salt.

A highly sensitive method for determining peroxides depends on the oxidation of an oil-soluble leuco base to a colored material which can then be used for the determination of the peroxide content by comparison with a standard.

It has been found that a reagent prepared by dissolving 5 grams of toluidine blue in 500 cc. of water containing 50 ml. of concentrated hydrochloric acid may be reacted with 200 ml. of a chloroform solution containing about 7 grams of an oil-free oil-soluble sulfonic acid, such as petroleum sulfonate of about 450 molecular weight and, on gentle agitation of the two solutions, the oil-soluble salt of the toluidine blue is formed and extracted by the chloroform. After separation of the chloroform phase it is separated from water by centrifuging and diluted to a liter with additional chloroform. A leuco-base reagent is prepared by gently agitating in a separatory funnel, about 50 ml. of the chloroform dye solution with 10 ml. of 20% sodium hydrosulfite and 15 ml. of saturated sodium bisulfite. Reduction to the colorless leuco base takes place and after settling to clear layers approximately 3 ml. of the reagent is added to a 10 ml. sample of the peroxide-containing material through which oxygen-free nitrogen has been permitted to bubble gently for a few minutes to remove dissolved air. As little as one part in 10 million of active oxygen will cause a blue color to form which can be compared in a conventional colorimeter with a solution of toluidine blue in water having a concentration of 0.005% toluidine blue. This concentration of toluidine blue in water corresponds to an active oxygen content of about 2 parts per million.

With the above sensitive test the isoprene treated in the manner earlier described in this example showed no trace of peroxides or active oxygen.

*Example II*

Butadiene which had accumulated peroxides in storage was permitted to pass upwardly in countercurrent flow through a column toward a descending 10% by weight solution of sodium hydrosulfite to which had been added sodium bisulfite and a solution of methylene blue oil-soluble petroleum sulfonate in a refined mineral oil of 100 sec. Saybolt at 100° F. in order to provide intimate contact between the butadiene and the aqueous phase. The butadiene leaving the tower was perfectly free of peroxides and showed no tendency to form popcorn types of polymer through subsequent stages of plant processing equipment.

*Example III*

An uninhibited gasoline was maintained in storage in an iron tank over an aqueous layer containing in solution sodium hydrosulfite, sufficient sodium carbonate to render the solution alkaline and non-corrosive and 0.01% of methylene blue. At various times over a one year period, samples of gasoline were removed from the storage tank and tested for peroxides. The results indicated that as long as an effective concentration of sodium hydrosulfite was present to maintain the methylene blue in the form of its leuco base, no peroxides were detectable.

What is claimed is:

1. A process for removing peroxide and dissolved oxygen contaminants from an olefin susceptible to the formation of peroxides by the action of oxygen, which comprises contacting said olefin in fluid state with a reagent containing a leuco-base of a water-soluble dyestuff in a solution that is immiscible with said olefin so that the thus treated olefin remains as a separate phase from the reagent solution containing the leuco-base.

2. A process for removing peroxide and dissolved oxygen contaminants from a liquid diolefin, which comprises mixing the diolefin tending to contain such contaminants with an aqueous reagent that contains sodium hydrosulfite and a leuco-base of a water-soluble dyestuff in aqueous solution which is immiscible with the diolefin freed of the contaminants from the aqueous reagent solution by which the contaminants are removed, and separating the diolefin thus treated from said aqueous solution.

3. A process as described in claim 2, in which the aqueous reagent solution contains an acidifying substance to at least neutralize the alkalinity present in the aqueous solution from the hydrosulfite.

4. A process for removing peroxides and dissolved oxygen contaminants from a liquid diolefin and maintaining said liquid diolefin free of said contaminants, which comprises contacting said liquid diolefin with an aqueous solution of sodium hydrosulfite and a leuco-base of a water-soluble dyestuff which remains dissolved in the aqueous solution, said aqueous solution being immiscible with the liquid diolefin.

5. A reagent useful for removing peroxide and dissolved oxygen contaminants from gaseous diolefins, comprising a leuco-base of a water-soluble dyestuff chemically combined with an oil-soluble sulfonic acid and mixed with sodium hydrosulfite.

6. A composition comprising an olefinic liquid heterogeneously mixed with an aqueous solution of sodium hydrosulfite and a small amount of leuco-base which undergoes oxidation to a water-soluble dyestuff in said aqueous solution, said olefinic liquid being maintained free of peroxide and free of dissolved oxygen contaminants, and said aqueous solution containing the hydrosulfite and leuco-base dissolved therein being maintained as a liquid phase separate from the olefinic liquid phase while in contact therewith.

CHARLES A. COHEN.

REFERENCES CITED

The following references are of record in the file of this patent:

UNITED STATES PATENTS

| Number | Name | Date |
| --- | --- | --- |
| 1,771,763 | Bauder | July 29, 1930 |
| 2,006,756 | Bartram | July 2, 1935 |
| 2,087,597 | Gutzeit | July 20, 1937 |
| 2,115,781 | Morrell | May 3, 1938 |
| 2,263,273 | Paulsen | Nov. 18, 1941 |
| 2,318,742 | Britton | May 11, 1943 |
| 2,427,212 | Henderson et al. | Sept. 9, 1947 |
| 2,445,367 | Robey et al. | July 20, 1948 |
| 2,449,010 | Robey et al. | Sept. 7, 1948 |

OTHER REFERENCES

Jour. Ind. Eng. Chem., News Ed. (1940), vol. 18, No. 9, page 404.